United States Patent
Abbing (10) Patent No.: US 10,823,431 B2
(45) Date of Patent: Nov. 3, 2020

(54) METHOD AND A LIQUID DISTRIBUTION SYSTEM FOR SAVING LIQUID AND THERMAL ENERGY

(71) Applicant: 3EFLOW AB, Luleå (SE)

(72) Inventor: Erik Abbing, Luleå (SE)

(73) Assignee: 3EFLOW AB, Lulea (SE)

( * ) Notice: Subject to any disclaimer, the term of this patent is extended or adjusted under 35 U.S.C. 154(b) by 390 days.

(21) Appl. No.: 15/738,271

(22) PCT Filed: Jun. 27, 2016

(86) PCT No.: PCT/EP2016/064867
§ 371 (c)(1),
(2) Date: Dec. 20, 2017

(87) PCT Pub. No.: WO2017/001343
PCT Pub. Date: Jan. 5, 2017

(65) Prior Publication Data
US 2018/0172286 A1    Jun. 21, 2018

(30) Foreign Application Priority Data
Jul. 2, 2015 (SE) ........................ 1550941

(51) Int. Cl.
*F24D 17/00* (2006.01)
*E03B 7/04* (2006.01)
*F16L 55/053* (2006.01)

(52) U.S. Cl.
CPC ............. *F24D 17/001* (2013.01); *E03B 7/04* (2013.01); *E03B 7/045* (2013.01);
(Continued)

(58) Field of Classification Search
CPC ..... Y02B 30/18; F24D 19/083; F24D 19/088; F24D 17/001; F24D 17/0078; E03B 7/08; E03B 7/075; E03B 7/045; E03B 7/04
See application file for complete search history.

(56) References Cited

U.S. PATENT DOCUMENTS 3,343,560 A * 9/1967 Nankivell ............. F16L 55/055
137/207
4,885,085 A * 12/1989 Beall, Jr. ................ B01D 61/08
210/137
(Continued)

FOREIGN PATENT DOCUMENTS

DE    4406150 A1    9/1995
FR    2400157 A1    3/1979
(Continued)

OTHER PUBLICATIONS

International Search Report and Written Opinion from corresponding International Application No. PCT/EP2016/064867, dated Oct. 13, 2016.

*Primary Examiner* — Steven S Anderson, II
(74) *Attorney, Agent, or Firm* — Tucker Ellis LLP (57) ABSTRACT

A method and a system for saving liquid and thermal energy, where a centrally located source of liquid is connected via separate feeding conduits to a plurality of liquid tap units. Each feeding conduit (FC1) is connected to a dampening chamber (D1) via a passage (OP1) containing an inlet (INi) to a liquid valve (VI) adapted to open when liquid reaches the inlet, so that liquid will flow from the feeding conduit to the associated liquid tap unit (LT1). Each feeding conduit is also connected to an evacuation pump (EP) via an evacuation valve (EV), which pump empties the feeding conduit after supply of the respective tap unit.

15 Claims, 8 Drawing Sheets

(52) U.S. Cl.
CPC ........ *F24D 17/0078* (2013.01); *F16L 55/053* (2013.01); *Y02B 30/18* (2013.01)

(56) References Cited

U.S. PATENT DOCUMENTS

| | | | |
|---|---|---|---|
| 6,171,481 B1* | 1/2001 | Walfridsson | B01D 29/114 210/117 |
| 2009/0020172 A1* | 1/2009 | Walker | C02F 1/006 137/563 |
| 2012/0211085 A1* | 8/2012 | Abbing | E03B 7/04 137/1 |
| 2013/0269813 A1 | 10/2013 | Jang | |
| 2014/0202543 A1 | 7/2014 | Abbing | |
| 2014/0261763 A1 | 9/2014 | Beckman | |

FOREIGN PATENT DOCUMENTS

| | | |
|---|---|---|
| JP | 2006010172 A | 1/2006 |
| WO | 2008012726 A2 | 1/2008 |
| WO | 2010103521 A2 | 9/2010 |
| WO | 2012148351 A1 | 11/2012 |

\* cited by examiner

Fig.1

(PRIOR ART)

OPEN

Fig.3B

CLOSED

OPEN

Fig.8A

CLOSED

Fig.8B

METHOD AND A LIQUID DISTRIBUTION SYSTEM FOR SAVING LIQUID AND THERMAL ENERGY

FIELD OF THE INVENTION

The present invention relates to a method and a liquid distribution system for saving liquid and thermal energy, where a centrally located source of liquid is connected via separate feeding conduits to a plurality of liquid tap units, comprising the steps of evacuating the liquid from the associated feeding conduit after completion of a tapping operation at an associated liquid tap unit, by generating a backward pressure gradient in said associated feeding conduit, so that the liquid flows backwards towards said liquid source and said associated feeding conduit thereafter contains only gas being retained therein, and refilling, upon activating said liquid tap unit, said associated feeding conduit with liquid by generating a forward pressure gradient in said associated feeding conduit and to permit liquid to flow from said liquid source to said associated liquid tap unit, while pushing the remaining gas in the feeding conduit towards said associated liquid tap unit at an operating pressure exceeding an ambient air pressure level.

Primarily, the method has been developed for hot water distribution systems in buildings, but the principles applied in the invention may very well be implemented also for other liquids, and also for distributing cold liquids. In both cases, there is an inherent problem that thermal energy will be lost when the hot or cold liquid is retained stationary in the feeding conduits, when the associated liquid tap units are not being used. Apart from the thermal loss, there will also be an inevitable loss of liquid if the volume of liquid remaining in a feeding conduit, after many hours, will be tapped, since the consumer will let the liquid flow until the desired temperature of the flowing liquid will be attained.

A normal system will entail a hot water system in a large building, with a plurality of water tap units. Each such tap unit may comprise a number of taps, e.g. in a rest room, a kitchen, or some other room where there are one or more taps for hot water, normally also being serviced by cold water feeding conduits, including mixing taps where the water temperature may be controlled by the consumer.

Such a system can be used for example in a relatively large building, with many apartments or offices, possibly at many stories, or in a small building, e.g. for a single family.

The liquid source, i.e. the point of liquid supply to the various feeding conduits, may be connected to a public water supply line or a local water supply or heating vessel. Normally, it has a capacity which will enable a supply of cold and hot water at a substantially constant pressure, which is typically much higher than the ambient air pressure, such as 2 to 5 bars over-pressure (above the pressure of the ambient air at the liquid source).

BACKGROUND OF THE INVENTION AND PRIOR ART

Such a method is disclosed in Applicant's international (PCT) patent application WO2012/148351. A similar method is also previously known from the German published specification DE 4406150 A1 (Pumpe et al). In both these prior art cases, the liquid in the feeding conduits is sucked back to the liquid source after completion of a tapping operation. Also, in both cases, there is a gas valve unit located in proximity to a liquid valve unit for feeding gas or air into the system so as to replace the liquid with gas, after completion of a tapping operation. This gas or air will thus flow into the feeding conduit through a gas passage in a gas valve unit. In this way, the pressure in the feeding conduits will remain very close to the ambient air pressure. Moreover, this gas passage is separate from a liquid passage, where liquid flows from the feeding conduit to the associated liquid tap unit. The gas valve unit will serve both as a gas inlet valve and as a gas outlet valve. Therefore, the gas pressure in the evacuated feeding conduits will be almost the same as the ambient air pressure.

OBJECT OF THE INVENTION

Against this background, a main object of the present invention is to provide a similar method and a system where the refilling of liquid will proceed faster than in the prior art systems, while securing an effective dampening of the liquid when it reaches the vicinity of the liquid tap unit during each refilling operation. This should also be achieved with simple means which are easy to manufacture and install in a building or the like. There should be no need for an elevated (higher than normal) pressure or capacity at the liquid source.

SUMMARY OF THE INVENTION

In order to achieve these objects, the present invention provides an improved method, wherein the liquid distribution system operates at a relatively low pressure, when the liquid is being evacuated after a tapping operation, and at a relatively high, but typically still fairly normal, pressure during a tapping operation, as indicated in the appended claims. During the entire operation of the liquid distribution system, each of the feeding conduits is kept in communication with an associated dampening chamber via an associated passage accommodating an inlet to a liquid valve which is connected to or integrated with an associated liquid tap unit. In use, the feeding conduit, the associated passage and the associated dampening chamber form a closed system being separated in respect of the remaining gas therein, from the ambient air. During the refilling step, the refilling liquid is brought to flow through the feeding conduit into the associated passage while pushing the remaining gas into the associated dampening chamber, which will thus collect the remaining gas. During the refilling step, the liquid valve is kept closed until the refilling liquid has reached and passed beyond the inlet. Thereafter, the liquid valve is caused to open, so as to let liquid, but no gas or air other than possibly during a start-up phase of the liquid distribution system, to flow via the liquid valve into the associated liquid tap unit.

Preferably, a low enough pressure of the refilling liquid is achieved by reducing the pressure, at the end of the evacuating step, until the associated feeding conduit is free of liquid, or a lowermost pressure level has been reached which is substantially lower than the pressure level of the ambient air at the associated liquid tap unit. Importantly, no ambient air is let into the closed system formed by the particular feeding conduit, the associated passage and the associated dampening chamber, during the evacuation step.

The liquid valve may be caused to open when
the pressure of the liquid at said inlet of the liquid valve reaches a threshold pressure level being substantially higher than the ambient air pressure level, e.g. 25% to 75% of the pressure at the liquid source, or a sensor has sensed the presence of refilling liquid at said inlet of said liquid valve.

In normal operation, at stationary conditions, there will be no discharge of gas to or from the particular feeding conduit through the liquid tap unit. Possibly, some gas or air will escape through the liquid valve into liquid tap unit during a start-up phase of the system. It may occur that the system (each feeding conduit) is totally filled with air when the system is being filled with liquid for the first time. Then, it will take a number of evacuation and refilling cycles until a certain volume (or rather weight or mass of air) has escaped via the liquid valve, so that the liquid valve will then be closed until the inflowing or refilling liquid has passed the inlet of the valve during a refilling operation. At this point, a steady state has been reached and the same kind of cycles will be repeated every time a liquid tap unit is activated.

A liquid distribution system according to the invention is characterized in that each of the feeding conduits communicates with a dampening chamber via an associated passage accommodating an inlet of a liquid valve which is connected to said associated liquid tap unit, each liquid valve being adapted, during a refilling operation, to keep the associated feeding conduit separated from the associated liquid tap unit by keeping the liquid valve closed, while pushing remaining gas into the associated chamber, until the refilling liquid has reached and passed beyond the inlet, said liquid valve being adapted to open after the entrance of liquid into said passage and compression of remaining gas in said closed dampening chamber during a refilling operation, each feeding conduit, the associated passage and the associated dampening chamber together forming a closed part of the system being separated in respect of any remaining gas therein, from the ambient air, at least after a possible start-up phase of the system, and a separate liquid evacuation pump is connectable to the feeding conduits and is adapted, upon being connected during an evacuation operation, to evacuate that feeding conduit until it is free of liquid. Then, due to the fact that no ambient air is let into the feeding conduit, the remaining air or gas in the feeding conduit has reached a lowermost pressure which is substantially lower than the ambient air pressure at each associated liquid tap unit and which will secure a low enough pressure during a subsequent refilling operation.

The method and the system according to the invention will entail the following advantages:

The refilling operation will proceed at a high speed, because the inflowing liquid will propagate with virtually no resistance initially, thanks to the low pressure of the gas remaining in the evacuated feeding conduit and the relatively high pressure at the liquid source. Only when a large portion of the total volume (of the feeding conduit and an associated dampening chamber) has been refilled with liquid will the pressure build up to a relatively high level therein.

Provided that there is only a small amount of gas in the system, in particular in the respective feeding conduits, the pressure will be relatively high only at the very last stage of the refilling process, then causing an effective dampening of the fast flowing liquid.

There is no need for a large dampening volume, because of the relatively high threshold pressure level of the liquid valve, so the apparatus, containing a dampening chamber, can be made in small dimensions and at relatively low cost, thus ensuring also moderate installation costs and no voluminous apparatus.

Since there is no need for a separate air valve communicating with the ambient air, there is no risk for problems originating from the malfunctioning of such an air valve, such as leakage of liquid and, of course, lower installation costs.

Even if the pressure of the liquid source is temporarily reduced somewhat, the system will continue to operate as long as the pressure in the liquid source is retained at a level exceeding any threshold level of the liquid valve being connected to the inlet of the particular tapping unit.

During the evacuation step, a separate evacuation pump will pump out the liquid in the particular feeding conduit, until a lowermost liquid level is reached. In this way, the operation will be reliable, and there is no risk of leaving any liquid in the feeding conduit after a tapping operation.

By using a separate evacuation pump, and possibly a separate evacuation valve, it will be possible to feed liquid into at least one of the feeding conduits while at the same time evacuating liquid from at least one other feeding conduit.

The various components to be used in the liquid distribution system according to the present invention may be modified in many ways, for example as disclosed in the parallel patent applications filed by the same applicant on the same day, relating to a "a liquid distribution unit", "a dampening valve unit" and "a fluid stop valve unit".

Further features and advantages will appear from the detailed description below, where a preferred embodiment of the invention, and some modifications, are disclosed.

BRIEF DESCRIPTION OF THE DRAWINGS

The invention will now be explained further below, with reference to the appended drawings which illustrate preferred embodiments of a valve device according to the invention.

DETAILED DESCRIPTION OF A PREFERRED EMBODIMENT OF THE INVENTION

In the description below, the liquid distribution system is intended for hot water, e.g. in a building. However, those skilled in the art will realize that the system may alternatively be used for any other liquid. Furthermore, the system may alternatively be used for the distribution of cold water or some other cold liquid.

Figure 1:
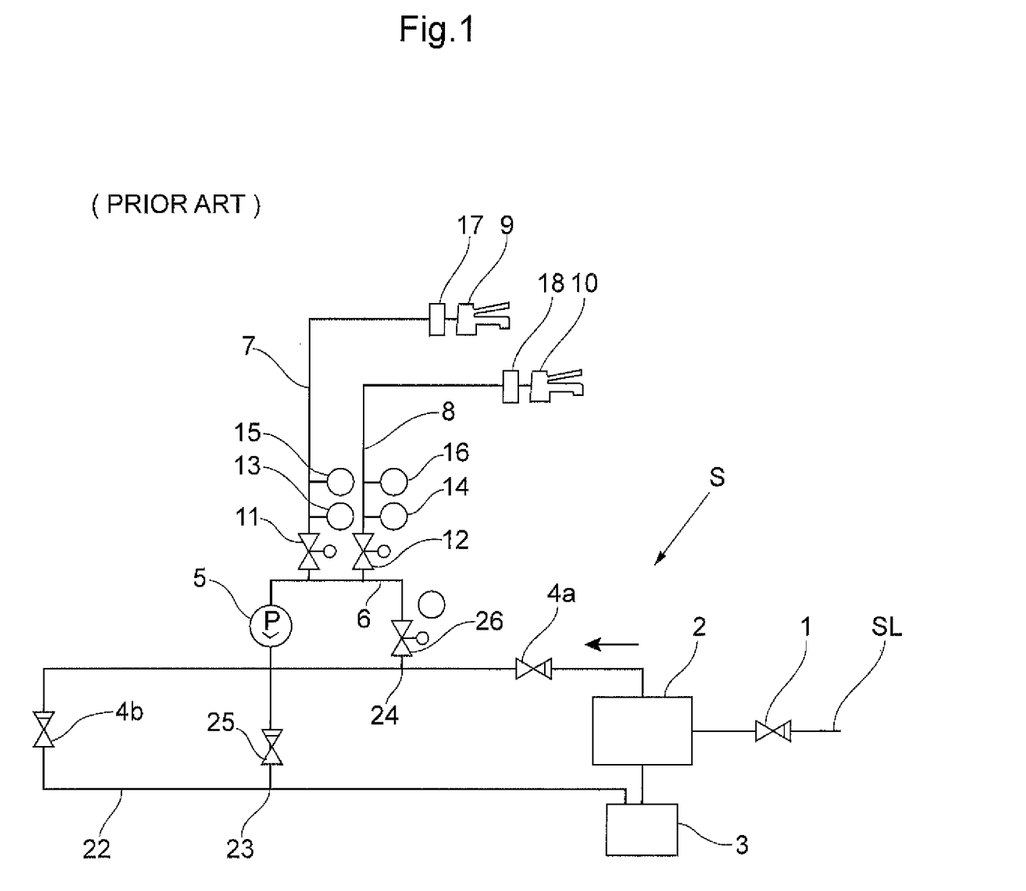
FIG. 1 illustrates schematically a prior art liquid distribution system as disclosed in the above mentioned international patent application.

In the prior art system shown in FIG. 1, water is supplied from a source S of fresh water, e.g. a public water supply line SL or a local water supply, via a non-return valve 1 to a hot water tank 2, where the water is heated to a relatively high temperature, typically in the interval 60-90° C. There is a re-circulating loop 22 of hot water passing through the water heater 2 and a hydro-pressure vessel 3 serving to accommodate a variable volume of air or gas at an operating pressure. The hot water is circulated by means of a circulation pump (not shown) adjacent to the heater 2, and two further non-return valves 4a,4b will ensure that the circulation is maintained in one direction only. Moreover, there is a hot water feed line 6 bridging the loop 22 at two points 24 and 23. In the hot water feed line 6, there is a pump 5 for circulating hot water along the feed line 6. The pump 5 will operate even in case all hot water feeding conduits 7,8, leading to various hot water tap units 9,10 in a building, are passive or closed, so that the liquid remaining in the feeding conduits may be evacuated. Thus, the pump 5 has a dual purpose.

In each hot water feeding conduit 7,8, adjacent to the connection to the hot water source S, there is a control valve 11 and 12, respectively, which can be opened or closed, a level sensor 13 and 14, respectively, and a pressure sensor 15 and 16, respectively. All these components are located centrally, near the hot water source, together with the hot water tank 2 and the circulating loop 22 with its bridging line 6. In the hot water bridging line 6, there is also a non-return valve 25 and a control valve 26.

The hot water tank 2, the re-circulating loop 22 and the bridging hot water line 6 may be regarded as a heat source or hot water source 5, since the circulating water is always kept at an elevated temperature and will continuously supply hot water to the hot water feeding conduits 7, 8. If necessary, the hot water source may be contained in an insulated enclosure, or the components may be individually covered with by an insulating material.

As described in the above-mentioned PCT application WO2012/148351, hot water will only be present in the liquid feeding conduits 7, 8 when hot water is being tapped from the respective tap unit 9 and 10. When the tap unit 9, 10 is being closed, possibly after a short delay (e.g. a few minutes) which does not significantly affect the temperature of the hot water in the conduit, the hot water remaining in the respective feeding conduit will be pumped out in the backward direction by means of the pump 5, back to the hot water source 2, 22. In this process, the hot water will be replaced by ambient air or gas in the liquid conduit 7, 8. However, when the hot water has been evacuated, the respective valve 11, 12 will be closed, and a gas or air pressure, slightly below the ambient atmospheric air pressure, will remain in the feeding conduit 7, 8.

When hot water is going to be tapped again from the tap 8 or 10, a refilling operation will be initiated. The present invention provides for an improved method and system, as illustrated schematically in FIG. 2.

Figure 2:
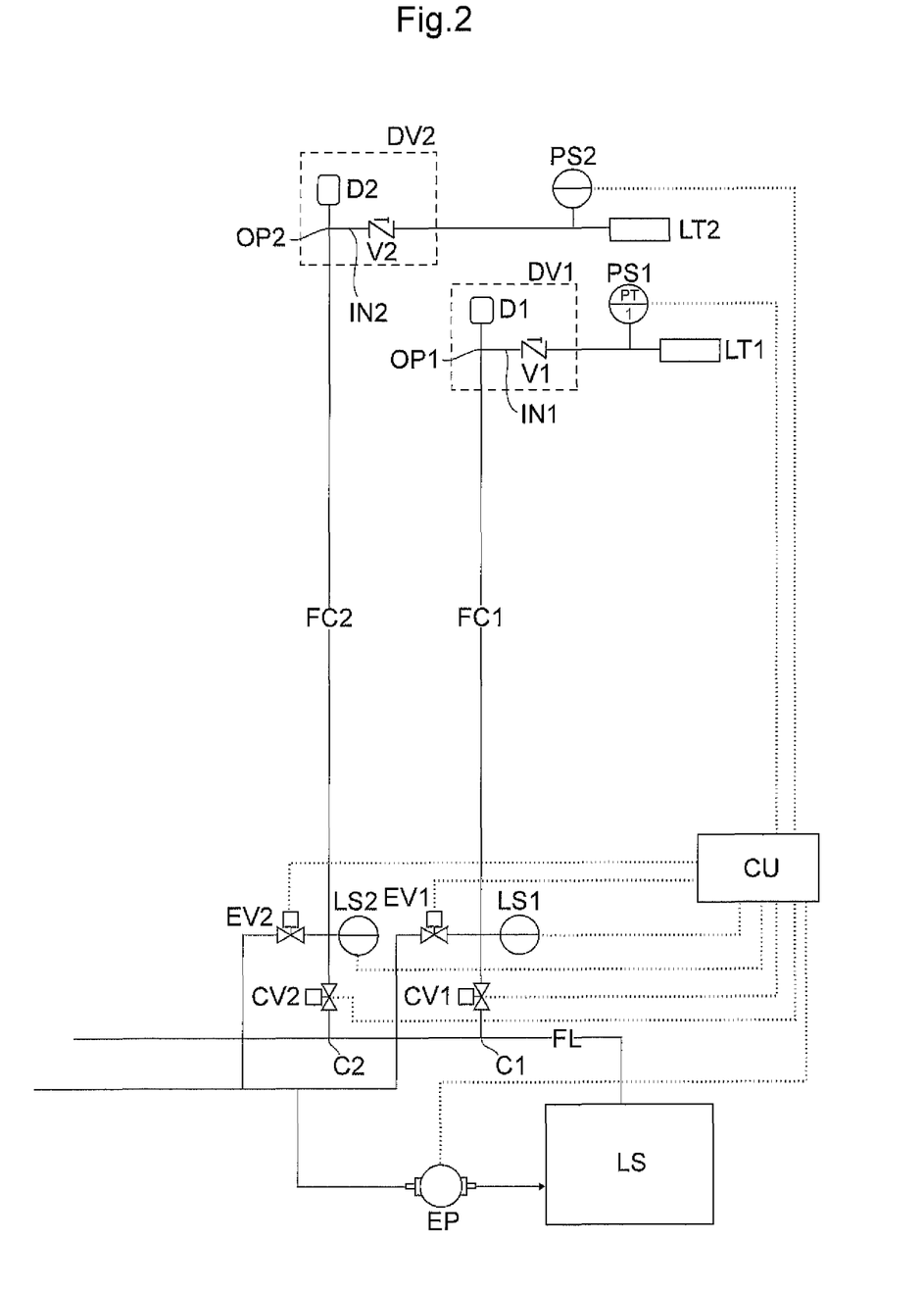
FIG. 2 shows, likewise schematically, a liquid distribution system according to the present invention, in a preferred embodiment.

A central liquid source LS, possibly corresponding to the hot water source 2, 22 in FIG. 1, is connected to a number of hot water feeding conduits FC1, FC2, etc. via a feed line FL, separate connections C1, C2, etc. and individual control valves CV1, CV2, etc. When the control valve CV1 is opened, hot water will flow rapidly into the associated feeding conduit FC1 which has been evacuated in a previous evacuation step.

There will be a high pressure gradient in the feeding conduit FC1, since the control valve CV1 is open and thus conveys a driving pressure from below, corresponding to the pressure prevailing in the liquid source LS (typically about 2 to 5 bars over-pressure or, in absolute terms, more than 300% of the ambient air pressure), and an upper very low pressure, such as 0.2 to 0.8 bar under-pressure or, in absolute terms, about 20 to 80% of the ambient air pressure. Accordingly, the hot water will flow at a high velocity towards the water tapping unit LT1. Normally the feeding conduits are at least 5 to 30 m long, from the liquid source LS to the respective hot water tap unit LT1, etc. within a building.

When the hot water approaches the liquid tap unit, there is a risk for a hard striking impulse, a so called "water hammer", of the hot water. However, as is known per se, from the above-mentioned PCT application WO 2012/1408351, a dampening chamber D1 is arranged in the vicinity of a liquid valve V1, so that an air or gas cushion will dampen the impact of the rapidly moving hot water.

According to the present invention, each dampening chamber D1, D2, etc. is connected to the end of the associated feeding conduit FC1, FC2, etc. via a passage OP1, OP2, etc. In this passage, there is an inlet to a liquid valve unit V1, V2, etc., e.g. a stop valve, a non-return valve or a check valve. See also FIGS. 3,4,5,6 and 7A, 7B, 8, 8A, 8B.

The structure of the dampening valve unit DV1, DV2, etc. (see FIGS. 3, 3A, 3B) is disclosed in detail in two separate patent applications being filed at the same day as the present application, denoted "a dampening valve" and "a fluid stop valve", respectively. Thus, the liquid valve unit V1, V2 may comprise two check-valves VA1, VA2 connected in series, being biased towards a closing position by a pressure responsive part, e.g. a non-linear spring device S1, comprising two mirrored diaphragm springs, so that the valve will shift from a closing position (FIG. 3B) to an open position (FIG. 3A) when a threshold pressure level (typically 25% to 75% of the pressure at the liquid source LS) has been reached at the inlet IN1, IN2, etc. of the valve. The non-linear spring device S1, etc. is such that, when the threshold pressure is reached, the valve body will move suddenly a relatively long way into its opening position (to the right in FIG. 3). So, the valve will open distinctly and permit a high flow of hot water immediately after the threshold pressure level has been reached.

Figure 3:
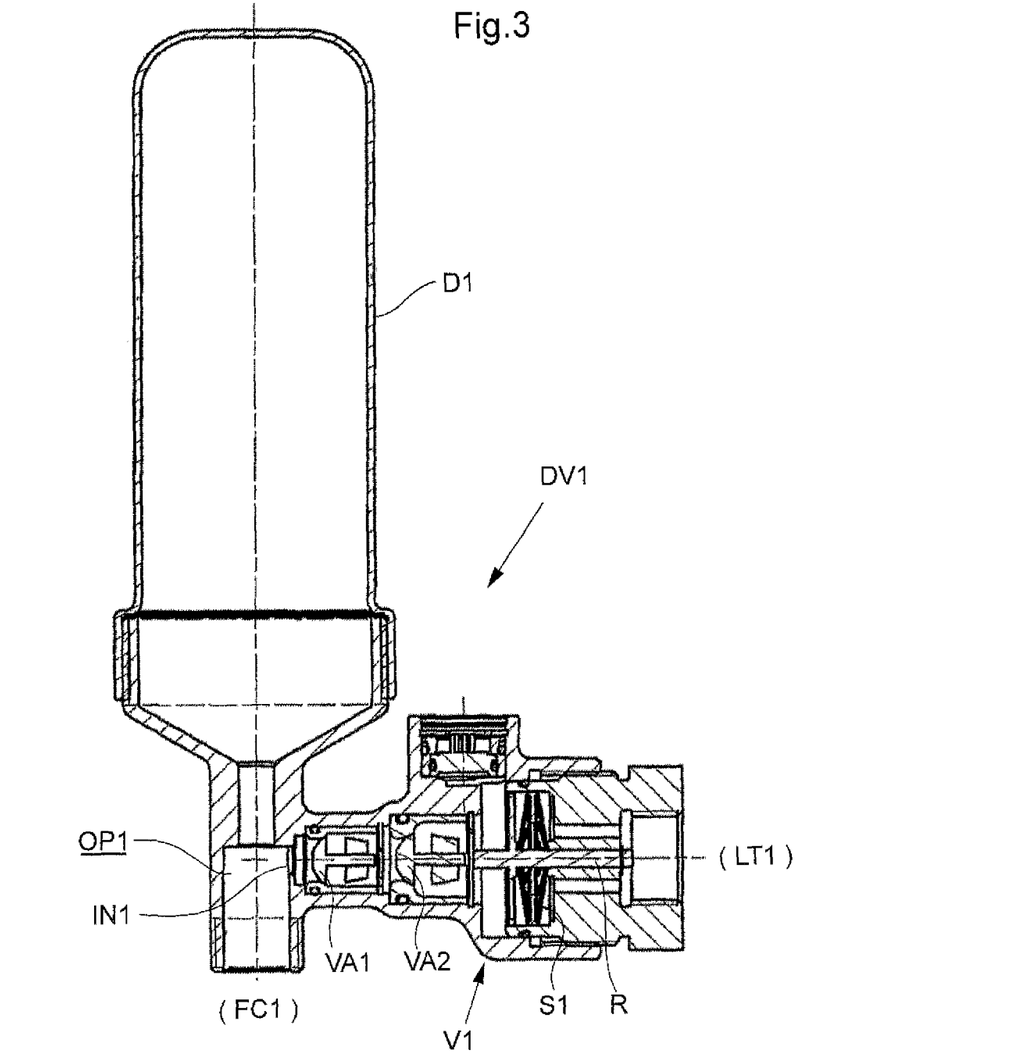
FIGS. 3, 3A, 3B show, in sectional views, a dampening valve unit being used in the system of FIG. 2, and FIGS. 4, 5, 6, 7A, 7B, and 8, 8A, 8B show a number of modified embodiments of the dampening valve unit of FIG. 3.
Figure 3A:
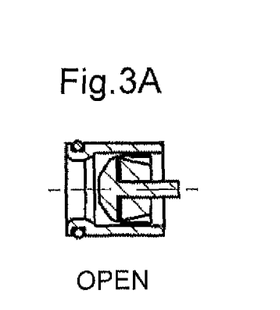
Figure 3B:
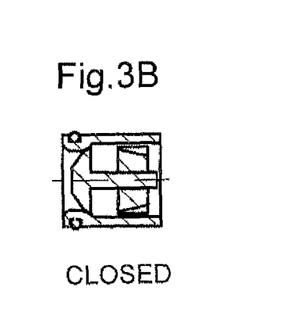

The spring device S1 is coupled to the two check-valves VA1, VA2 by means of an axial rod R, so that the end positions of the spring device will be transferred to the check valves which will thus be open (FIG. 3A) or closed (FIG. 3B).

Figure 6:
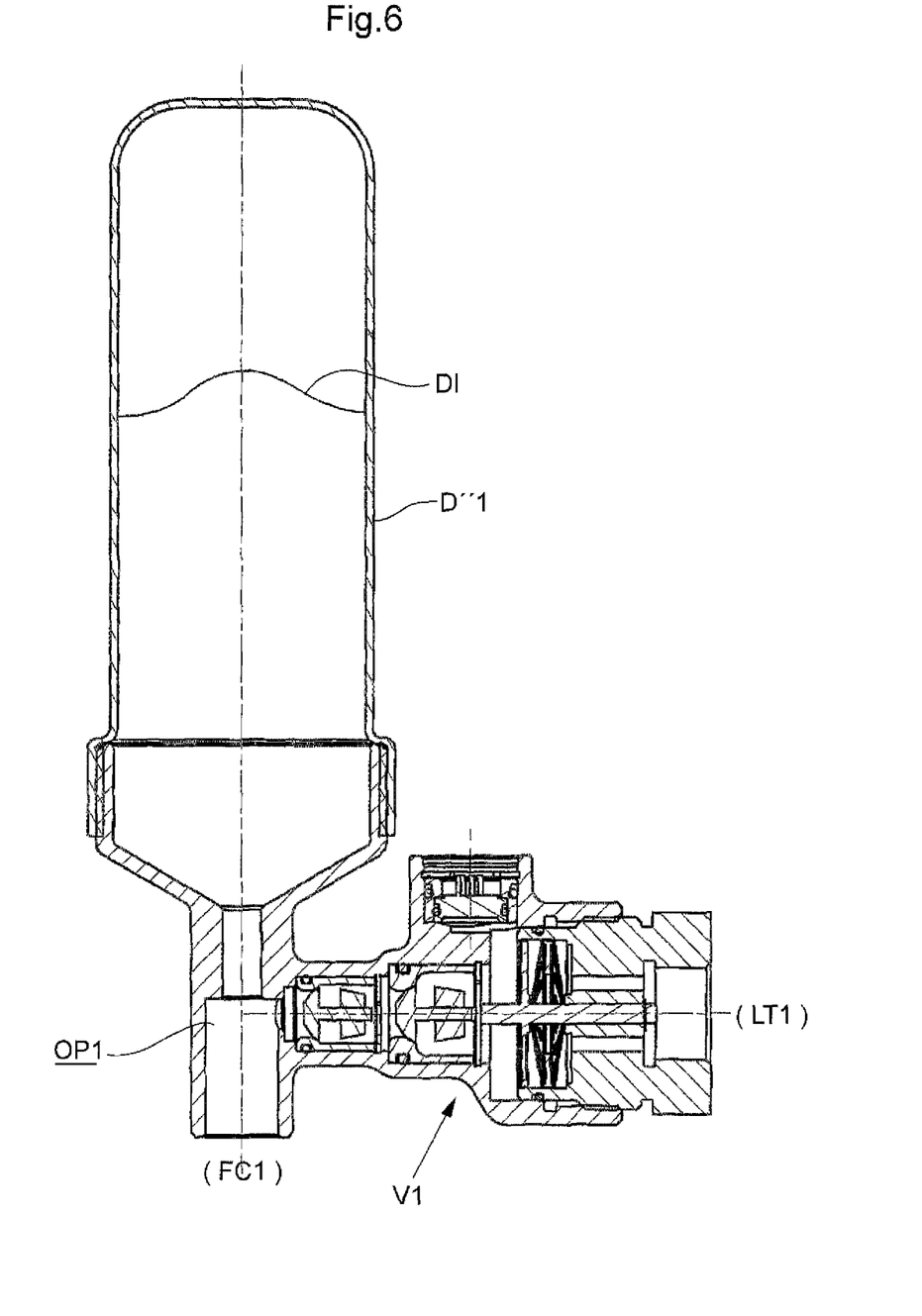
Figure 7A:
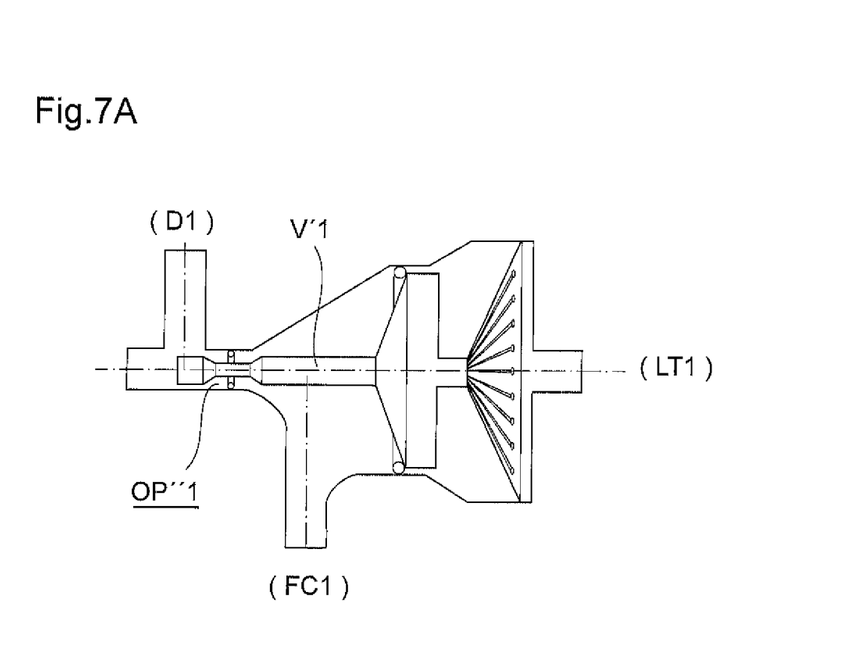
Figure 7B:
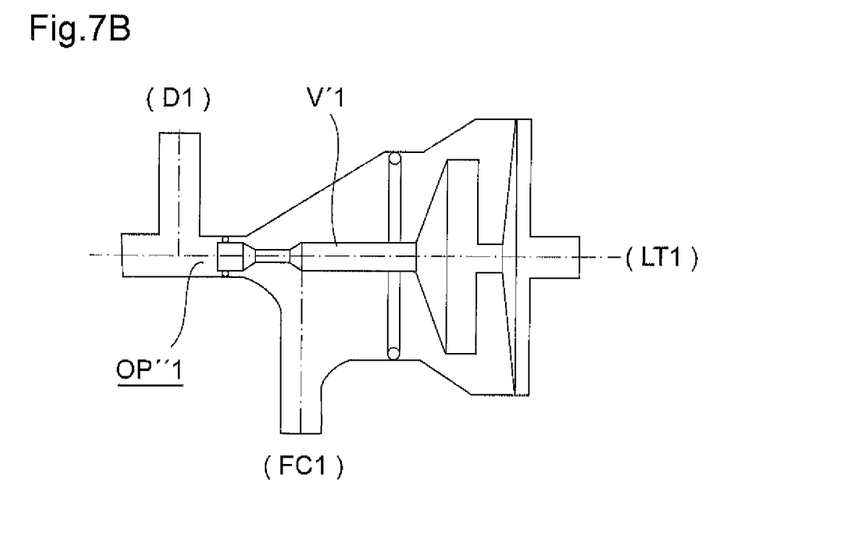
Figure 8:
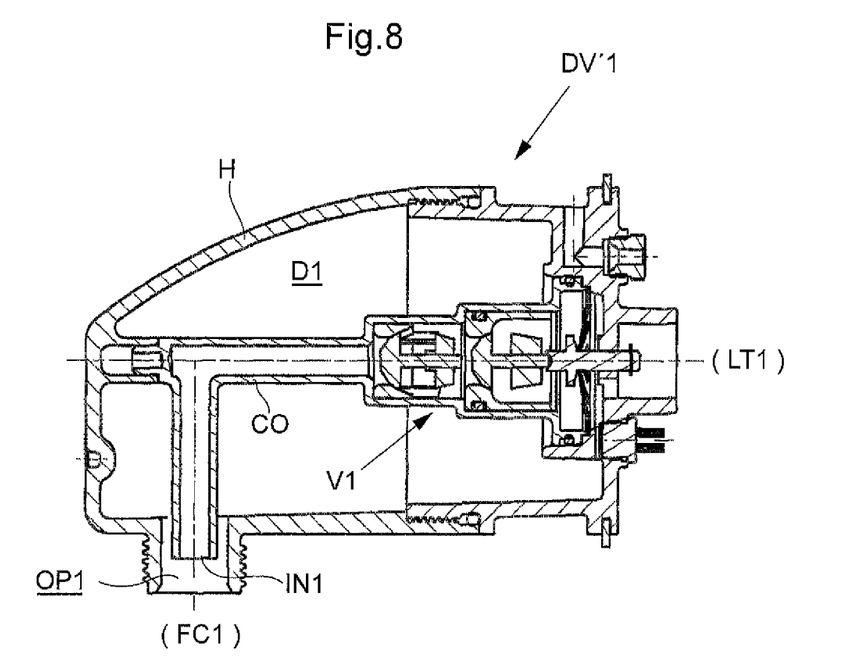

The dampening chamber D1, D2, etc. can be housed in a separate casing (as shown in FIGS. 3, 4, 5, 6, 7A, 7B), or it can be formed by a housing where the liquid valve V1 is located centrally (FIG. 8). In either case, the upper end of the feeding conduit FC1, FC2, etc. (FIG. 2) adjoins the above-mentioned passage OP1, OP2, etc., which also accommodates the inlet IN1, IN2, etc. of the valve V1, V2, etc.

The prevailing pressures and the volumes of the feeding conduits FC1, FC2, etc. are such that the pressure of the refilling water is still relatively low when it reaches the passage OP1, OP2, etc., below the set threshold pressure of the valve. Therefore, the water will move further upwards, beyond the passage OP1, OP2, etc. before the air or gas, being trapped in the adjoining dampening chamber D1, D2, etc., is compressed to such a degree that the air or gas pressure, causing a corresponding pressure in the water adjacent thereto, rises to a level corresponding to the threshold level of the valve V1, V2, etc. Then, the valve suddenly opens, and the hot water will flow through the valve into the adjoining liquid tap unit LT1, LT2, etc. Since there is now only water in the passage OP1, OP2, etc., only water, an no gas or air, will flow through the valve and into the liquid tap LT1, LT2, etc. The pressure in the liquid source LS, being much higher than the ambient air pressure (even at the liquid tap unit LT1, LT2, etc.) and the threshold pressure of the liquid valve V1, V2, etc., will ensure that the air or gas compressed in the dampening chamber D1, D2, etc. will stay compressed and not expand into the passage OP1, OP2, etc. during normal operation of the liquid distribution system.

As an alternative to opening the liquid valve upon reaching a threshold pressure, it is possible to provide a sensor that senses the presence of liquid in the passage OP1, OP2, etc. at the inlet IN1, IN2, etc. of the liquid valve V1, V2, etc. The sensor can be a level sensor, an optical sensor or a float sensor, in combination with a corresponding actuator, e.g. an electromagnetic device or a mechanical actuator, which will open the liquid valve V1, V2, etc. upon sensing the presence of liquid.

A further alternative is to provide a valve V1, V2, etc. which is held in a closed position also by a locking or latching member (not shown) which is released when a water detecting element has detected the presence of liquid at the inlet IN1, IN2, etc. of the valve. A resetting mechanism may then be provided for returning the valve to its closed position during the subsequent evacuation step.

Only when the tap handle, or a corresponding device or sensor, is activated for closing the particular liquid tap unit LT1, LT2, etc. will there be a change. Then, a pressure sensor PS1, PS2, etc. (see FIG. 2), inserted between the valve V1, V2, etc. and the associated liquid tap unit LT1, LT2 (or at some other location adjacent to the liquid valve or the liquid tap unit), will sense an increased pressure (the flow is stopped but the feeding pressure is still present) and send an electric signal to a control unit CU which will in turn close the control valve CV1, CV2, etc. adjacent to the liquid source LS. The control unit CU will also send a signal to a separate evacuation valve EV1, EV2, etc. so as to open the latter. This evacuation valve is arranged in a branch connection located downstream (as seen when the feeding conduit is refilled) but adjacent to the control valve CV1, CV2, etc. The evacuation valves EV1, EV2, etc. are jointly connected to an evacuation pump EP which will recirculate the hot water to the liquid source LS.

The pressure sensors PS1 and PS2 are schematically shown to be connected to the (short) conduit between the liquid valve V1, V2, etc. and the liquid tap unit LT1, LT2. However, alternatively, they may be arranged inside the casing of the liquid valve, at the outlet side thereof, or at or adjacent to the liquid tap unit itself.

Of course, instead of sending an electric signal via a control unit, it is possible, as disclosed in the above-mentioned PCT application WO 2012/148351, to let a pressure pulse or other physical variable propagate along the feeding conduit to the liquid source, where the pulse or other physical variable is sensed and used to trigger the closing of the control valve CV1, CV2, etc. and the opening of the evacuation valve EV1, EV2, etc.

When the particular feeding conduit FC1, FC2, etc. is connected to the liquid source via the evacuation valve EV1, EV2, etc., the liquid (hot water) will be sucked back by the evacuation pump EP into the liquid source LS. There is also a level sensor LS1, LS2, arranged to sense the liquid level at (or adjacent to) the branch connection. When this sensor senses that the liquid surface has reached a lowermost level, this indicates that all the liquid has been evacuated (removed) from the associated feeding conduit FC1, FC2, etc. An alternative is just to sense the low pressure adjacent to the control valve or the evacuation valve, the low pressure indicating that virtually all liquid has been evacuated from the feeding conduit.

Thus, at this time there will be a very low pressure, such as 0.5 bar under-pressure (50% of the ambient air pressure), or a pressure in the interval 0.2-0.8 bar under-pressure in the particular feeding conduit FC1, FC2, etc. Then, a signal is sent to the control unit CU, which will close the evacuation valve EV1, EV2, etc., so that the associated feeding conduit is retained in an evacuated state, and there will be no thermal loss due to heat being dissipated from the feeding conduit. In the feeding conduit FC1, FC2, etc. there is only gas or air left at a very low pressure (almost vacuum). A new refilling cycle can begin, being triggered or initiated by the opening of one of the liquid tap units.

The arrangement of the control valves CV1, CV2, etc. and the evacuation valves EV1, EV2, etc., being located separately in the branch connections, has the advantage that any one or a number of feeding conduits FC1, FC1, etc. can be evacuated independently of each other. Therefore, one or more of the feeding conduits FC1, FC2 may be evacuated while one or more of the other feeding conduits FC2, FC1, etc. are being refilled or are operative for tapping hot water at the associated liquid tap unit LT2, LT1, etc. In the prior art system as shown in FIG. 1, on the other hand, this was not possible. Rather, it was necessary to wait until all the feeding conduits were non-operative before it was possible to connect them to a jointly operating pump.

The special liquid distribution unit, comprising the feed line FL, the control valves CV1, CV2, etc., the separate evacuation valves EV1, EV2, etc. and the jointly connected evacuation pump EP, is disclosed in more detail in a separate patent application, entitled "a liquid distribution unit" being filed on the same date by the same applicant.

The modified embodiments in FIGS. 4, 5, 6, 7A, 7B and 8, 8A, 8B will now be described briefly.

Figure 4:
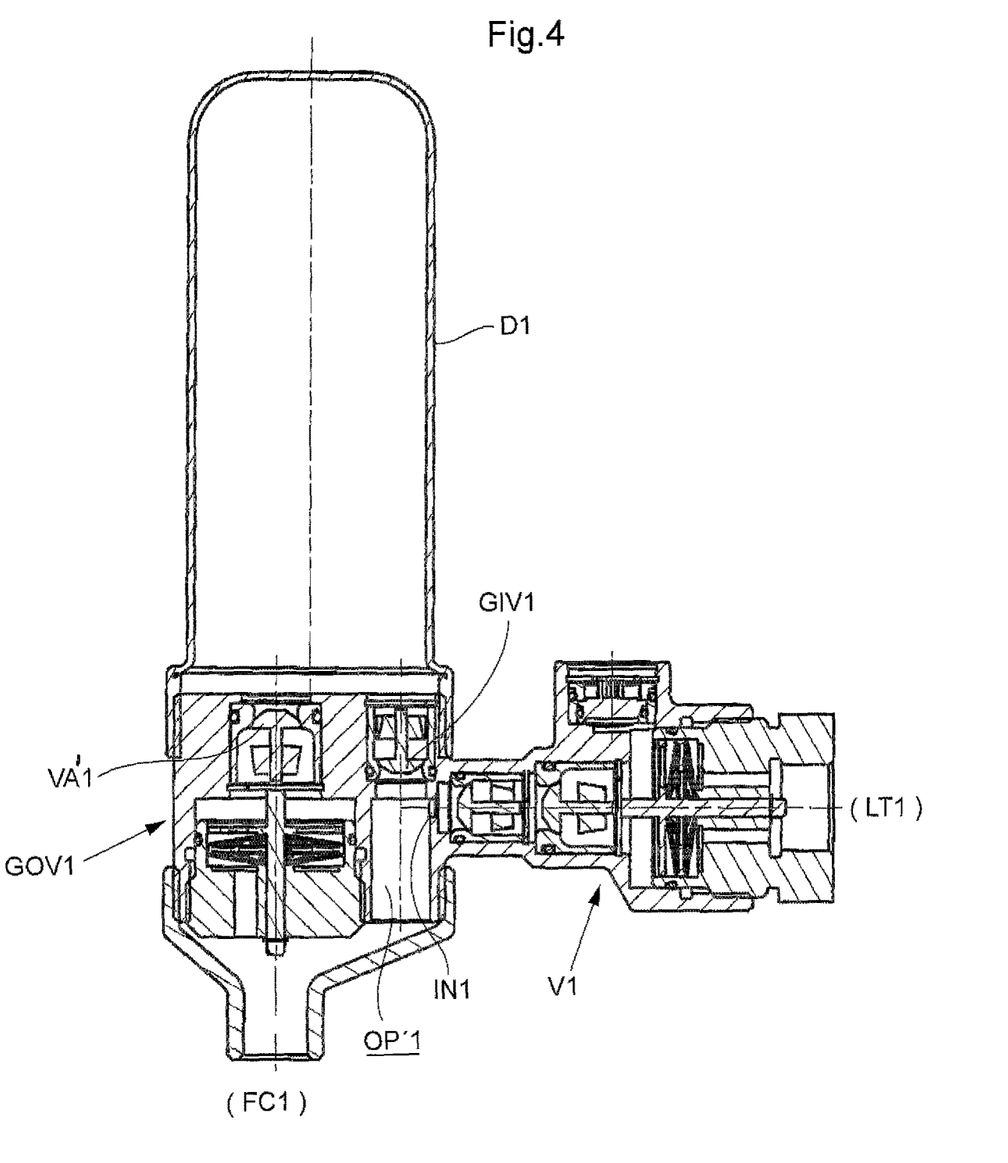

In FIG. 4, the liquid valve unit V1 is exactly like the liquid valve in FIG. 3. However, the associated dampening chamber D1 is connected to the feeding conduit FC1 via a passage OP'1 accommodating two parallel valve devices, a gas inlet valve GIV1, in the form of a non-return valve, for letting gas into the dampening chamber during the refilling of the feeding conduit FC1 when the pressure is higher than the ambient air pressure, e.g. exceeding 0.1 bar over-pressure, and a gas outlet valve GOV1, which will permit gas to flow back into the feeding conduit FC1 during evacuation of the latter. The gas outlet valve GOV1 will open when there a pressure difference exceeding a set value, e.g. 2 to 3 bars, is reached. The gas outlet valve is structured like the liquid valve unit V1 but has only one check valve (non-return valve) VA'1. Even when the pressure difference is reduced during evacuation, the gas outlet valve will stay open as long as there is a small pressure difference, and it may even stay open when the pressure difference has been reversed. Then, during the subsequent refilling with water, the entering water will cause the gas outlet valve to shift to its closed position. When a pressure of about 0.2 bar overpressure has been reached, the gas inlet valve GIV1 will open and let gas, and possibly some water, flow into the dampening chamber. The gas outlet valve GOV1 will stay closed during the tapping of hot water through the liquid valve V1.

The valve arrangement with the parallel outlet and inlet valves GOV1, GIV1 will ensure that the gas in the dampening chamber D1 will stay there when the liquid valve V1 opens, with an accompanying pressure reduction in the feeding conduit FC1, until a steady state is reached for the water flowing out through the valve V1to the associated hot water tap unit (LT1 in FIG. 2). In this way, it is avoided that air or gas will flow through the liquid valve V1.

Figure 5:
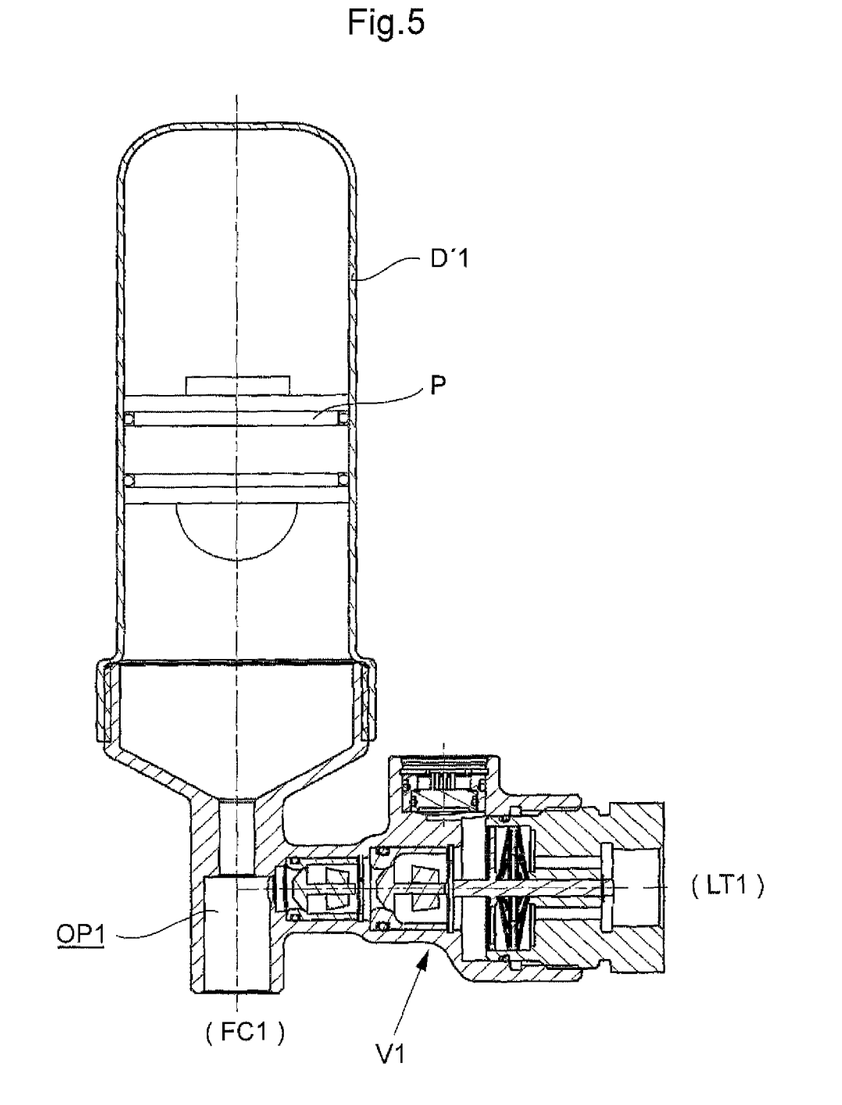

The dampening chamber may have a free inner space, as shown in FIGS. 3 and 4, or it may have a displaceable piston P as shown in FIG. 5 for the dampening chamber D'1 or a flexible diaphragm D1 as shown in FIG. 6 for the dampening chamber D"1. The piston P or the diaphragm will define an innermost compartment having a preset initial gas pressure which will vary but the gas in this compartment will not mix with the water during the refilling step.

The liquid valve may be structured differently, e.g. as shown in FIGS. 7A and 7B, where an elastomeric body V'1 is disposed in the passage OP"1 between the feeding conduit FC1 and the dampening chamber D1 and is displaceable between a position (FIG. 7A) where the passage OP"1 is open (and the liquid valve part to the right is closed) and a position (FIG. 7B) where the passage OP"1 is closed (and the liquid valve part to the right is open). The latter position is taken when hot water is flowing to the hot water tap unit LT1, whereas the other position is taken during the other phases of the cycle.

Figure 8A:
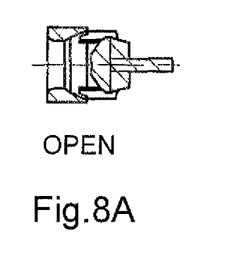
Figure 8B:
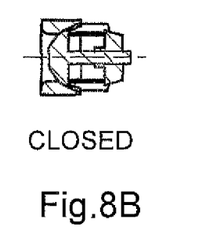

FIGS. 8, 8A, and 8B show an embodiment of the dampening valve DV'1 which is especially compact. Here the liquid valve V1 is disposed centrally within a housing H defining an internal dampening chamber D1. The inlet IN1 is located in an open passage OP1 between the feeding conduit FC1 and the dampening chamber D1. The inlet IN1, in the form of a small orifice, communicates with the liquid valve unit V1 via a conduit CO. The inner diameter of the conduit and the orifice inlet IN1 are such that even during evacuation of the feeding conduit FC1, water will remain in the conduit CO and prevent that gas enters into the liquid valve V1. Of course, in this case as well, the threshold level of the valve V1 is high enough to ensure that liquid (hot water) will reach the inlet IN1 before the valve V1 opens and permits the water to flow into the water tap unit LT1.

Those skilled in the art can modify the method and the liquid distribution system within the scope defined by the appended claims. For example, as indicated above, it would be possible to use the system for cold liquids rather than hot ones. The feeding conduits may consist of metal tubing, or plastic hoses. Of course, the threshold pressure level of the liquid valve V1, V2, etc. may be variable, so as to be set at a suitable value in each case, and it is also possible to vary these threshold pressure levels so as to optimize the system and the dampening characteristics at each dampening valve unit DV1, DV2, etc. Possibly, the volumes of the dampening chambers may also be variable.

As indicated above, it is a great advantage that there is no discharge of air or other gas during normal operation of the system. The dampening chamber is closed in relation to the ambient air, and the other fittings and connections should be air tight, even at very low or rather high pressures. There is no need for letting in ambient air through an inlet air valve, as was the case in the prior art systems. Therefore, the system will operate swiftly with a high refilling velocity and with great reliability and, therefore, at rather low service costs after a proper installation in a building.

The system may also be used in other units than buildings, e.g. in large vessels (water or air-borne) or moving vehicles, or in other units where there is a need for distributing hot or cold liquid to various tapping units.

The invention claimed is:

1. A method to save liquid and thermal energy in a liquid distribution system, where a centrally located source of liquid is connected via separate feeding conduits to a plurality of liquid tap units, comprising the steps of:
    evacuating the liquid from the associated feeding conduit, after completion of a tapping operation at the associated liquid tap unit, by generating a backward pressure gradient in said associated feeding conduit by means of a liquid evacuation pump, so that the liquid flows backwards towards said liquid source and said associated feeding conduit thereafter contains only gas being retained therein, and
    refilling, upon activating said liquid tap unit, said associated feeding conduit with liquid by generating a forward pressure gradient in said associated feeding conduit and permitting liquid to flow from said liquid source to said associated liquid tap unit, while pushing the remaining gas in the feeding conduit towards said associated liquid tap unit at an operating pressure exceeding an ambient air pressure level, wherein keeping each of said feeding conduits, during the entire operation of the liquid distribution system, in communication with an associated dampening chamber via an associated passage,
        said associated passage accommodating an inlet to a liquid valve which is connected to said associated liquid tap unit, and
        said feeding conduit, said associated passage and said associated dampening chamber forming, in use, a closed system being separated, in respect of the remaining gas therein, from the ambient air,
    evacuating, during the evacuation step, all liquid from the particular feeding conduit and said associated gas passage by means of said liquid evacuation pump, while reducing the pressure of the remaining gas down to a lowermost pressure level, which is substantially lower than the pressure level of the ambient air at said associated liquid tap unit,
    bringing the refilling liquid, during the refilling step, to flow through said feeding conduit and beyond said associated gas passage, while pushing said remaining gas, by means of said operating pressure which is substantially higher than said ambient air pressure level at any one of said liquid tap units, into said associated dampening chamber, and
    keeping said liquid valve closed during the refilling step, until the refilling liquid has reached said inlet and passed beyond said associated gas passage, whereupon the liquid valve is caused to open so as to let the refilling liquid, but no gas or air, flow via said liquid valve into said associated liquid tap unit.

2. The method defined in claim 1, wherein said liquid valve is caused to open
    when the pressure of the refilling liquid in said passage reaches a threshold pressure level which is substantially higher than said ambient air pressure level, or
    a sensor or a mechanical element has detected the presence of liquid at said inlet of the liquid valve.

3. The method defined in claim 1, wherein a rising pressure in the particular feeding conduit during the refilling step is achieved by opening a control valve located in said particular feeding conduit adjacent to said liquid source, so that the particular feeding conduit will communicate directly with said liquid source, the liquid pressure in said liquid source being maintained at said operating pressure.

4. The method defined in claim 1, wherein, during said evacuation step, liquid is recirculated from said particular feeding conduit into said liquid source by means of said liquid evacuation pump.

5. The method defined in claim 1, wherein the evacuation of liquid from said feeding conduit, during said evacuation step, is initiated by opening a separate evacuation valve being connected between said feeding conduit and said separate liquid pump.

6. The method defined in claim 1,
    wherein said lowermost pressure level is 20 to 80% of the ambient air pressure, and
    wherein said operating pressure is at least 300% of the ambient air pressure.

7. A liquid distribution system, for saving liquid and thermal energy, comprising:
- a centrally located liquid source,
- a number of feeding conduits being separately connected to said centrally located liquid source, each separate feeding conduit being connected to an associated liquid tap unit via an associated liquid valve,
- a liquid evacuation pump for evacuation of liquid in each feeding conduit when an associated tap unit is closed, each feeding conduit being refilled with liquid when the tap unit is opened,
- each of said liquid valves being adapted, during a refilling operation, to keep the associated feeding conduit separated from the associated liquid tap unit by keeping said liquid valve closed, while pushing remaining gas into an associated gas passage until the refilling liquid has reached said gas passage, and
- said liquid valve is adapted to open after the entrance of liquid into said passage and compression of the remaining gas in said dampening chamber during a refilling operation, wherein:
- a dampening chamber is associated with each feeding conduit,
- each of said gas passages is connected to a downstream end of the associated feeding conduit, the associated dampening chamber, and an inlet to the associated liquid valve such that each of said feeding conduits communicates with said dampening chamber via said gas passage and such that liquid is configured to flow from said feeding conduits into the associated gas passage and from the associated gas passage through the associated liquid valve to the associated liquid tap,
- each feeding conduit, the associated gas passage and the associated dampening chamber together form a closed part of the system being separated, in respect of any remaining gas therein, from the ambient air,
- said liquid valve is adapted to open after the entrance of liquid into said gas passage and compression of the remaining gas in said dampening chamber during a refilling operation, and
- a liquid evacuation pump is adapted, during each evacuation operation, to evacuate the liquid in the associated feeding conduit until a lowermost pressure has been reached which is substantially lower than the ambient air pressure at each associated liquid tap unit.

8. The liquid distribution system defined in claim 7, wherein said liquid evacuation pump is connectable to each feeding conduit via a separate evacuation valve.

9. The liquid distribution system defined in claim 7, wherein said liquid valve is adapted to open:
- when the pressure of the refilling liquid in said passage reaches a threshold pressure level which is substantially higher than said ambient air pressure level, or
- a sensor or a mechanical element has sensed the presence of liquid at said inlet of the liquid valve.

10. The liquid distribution system defined in claim 7, wherein a control valve is arranged in each feeding conduit adjacent to said liquid source.

11. The liquid distribution system defined in claim 7, wherein a pressure sensor is arranged to sense the liquid pressure level at the outlet side of said liquid valve, for initiating said evacuation operation when an increased liquid pressure is sensed upon closing the associated liquid tap.

12. The liquid distribution system defined in claim 7, further comprising at least one of
- a pressure sensor located at the outlet side of said liquid valve,
- a control valve, located in each feeding conduit adjacent to said liquid source,
- a level sensor, located in each feeding conduit adjacent to said liquid source,
and
- a separate evacuation valve.

13. The liquid distribution system defined in claim 7, wherein said associated gas passage comprises a gas inlet valve adapted to permit the flow of gas from said feeding conduit to said dampening chamber during refilling of the system with liquid, and a gas outlet valve adapted to permit the flow of gas from the dampening chamber during evacuation of liquid from the system.

14. The liquid distribution system defined in claim 7, where said liquid valve comprises at least one non-return valve and pressure responsive part.

15. The liquid distribution system defined in claim 14, wherein said pressure responsive part comprises a non-linear spring device causing a valve body to move from a closed position to an open position, so as permit a high flow of said liquid immediately after a threshold pressure level has been reached.

* * * * *